Aug. 28, 1928.
J. E. SCHMIDT
1,682,425
EQUALIZING MECHANISM FOR AUTOMOBILE BRAKES
Filed Oct. 22, 1927 3 Sheets-Sheet 1
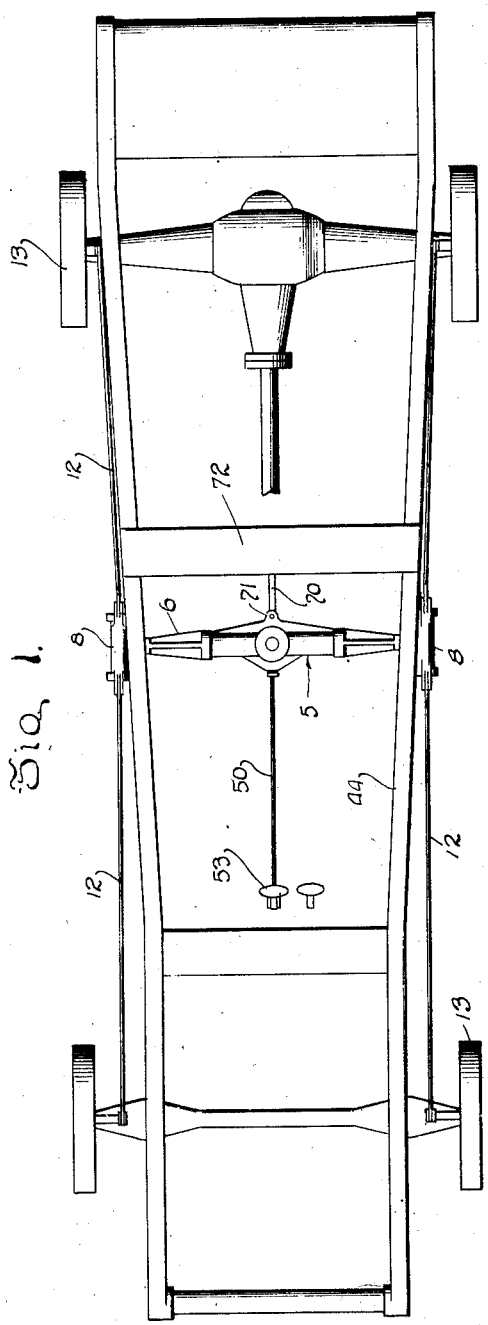
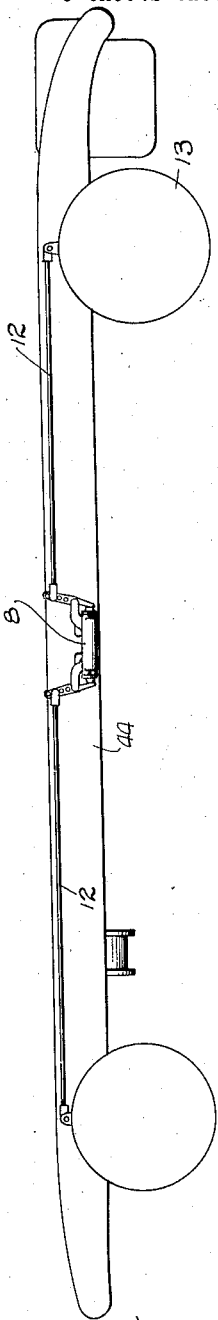
Witnesses
S. J. Collins
F. C. Appleton
Inventor
John E. Schmidt
By Joshua R H Potts
his Attorney

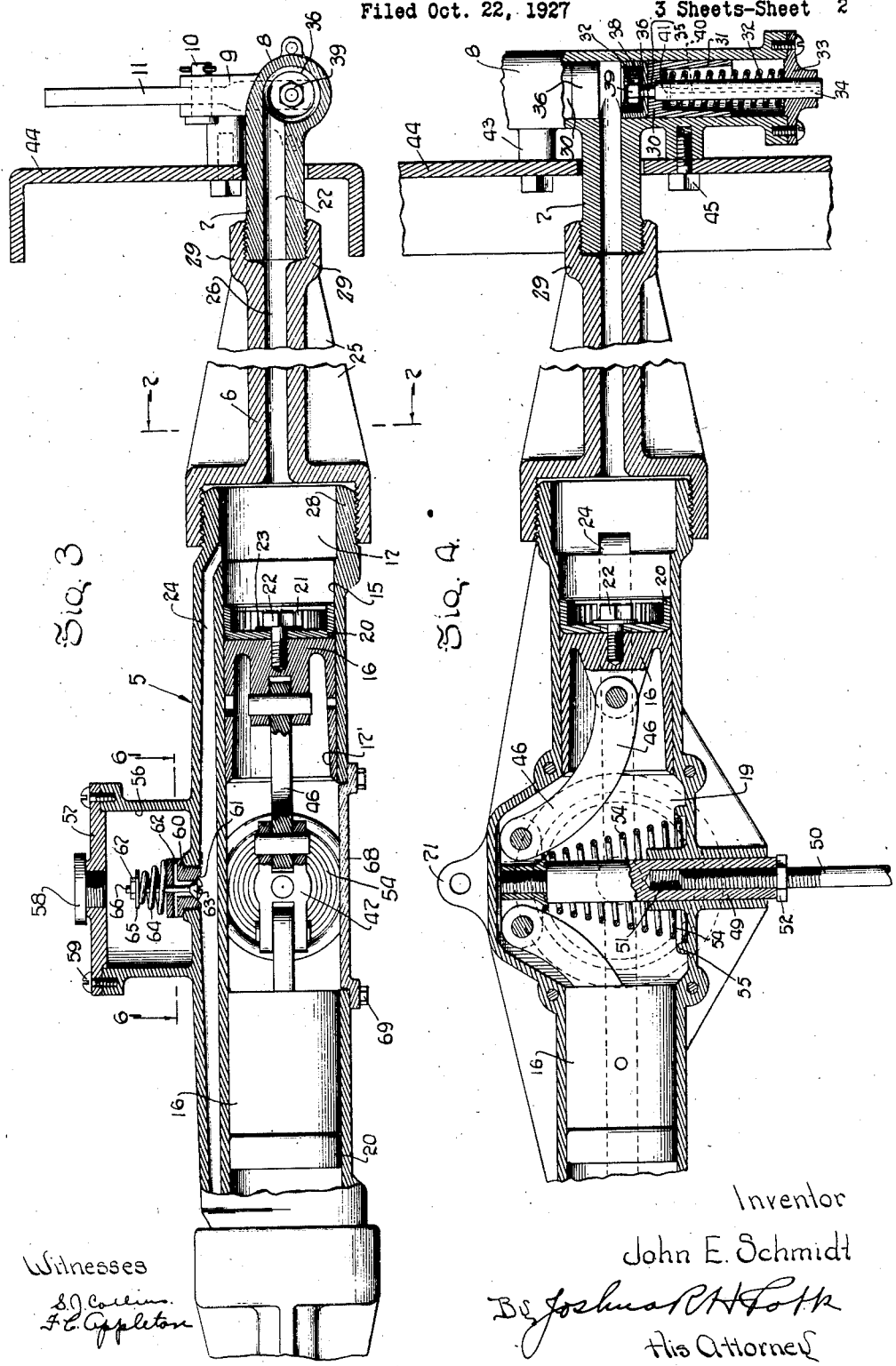

Aug. 28, 1928. 1,682,425
J. E. SCHMIDT
EQUALIZING MECHANISM FOR AUTOMOBILE BRAKES
Filed Oct. 22, 1927   3 Sheets-Sheet 3
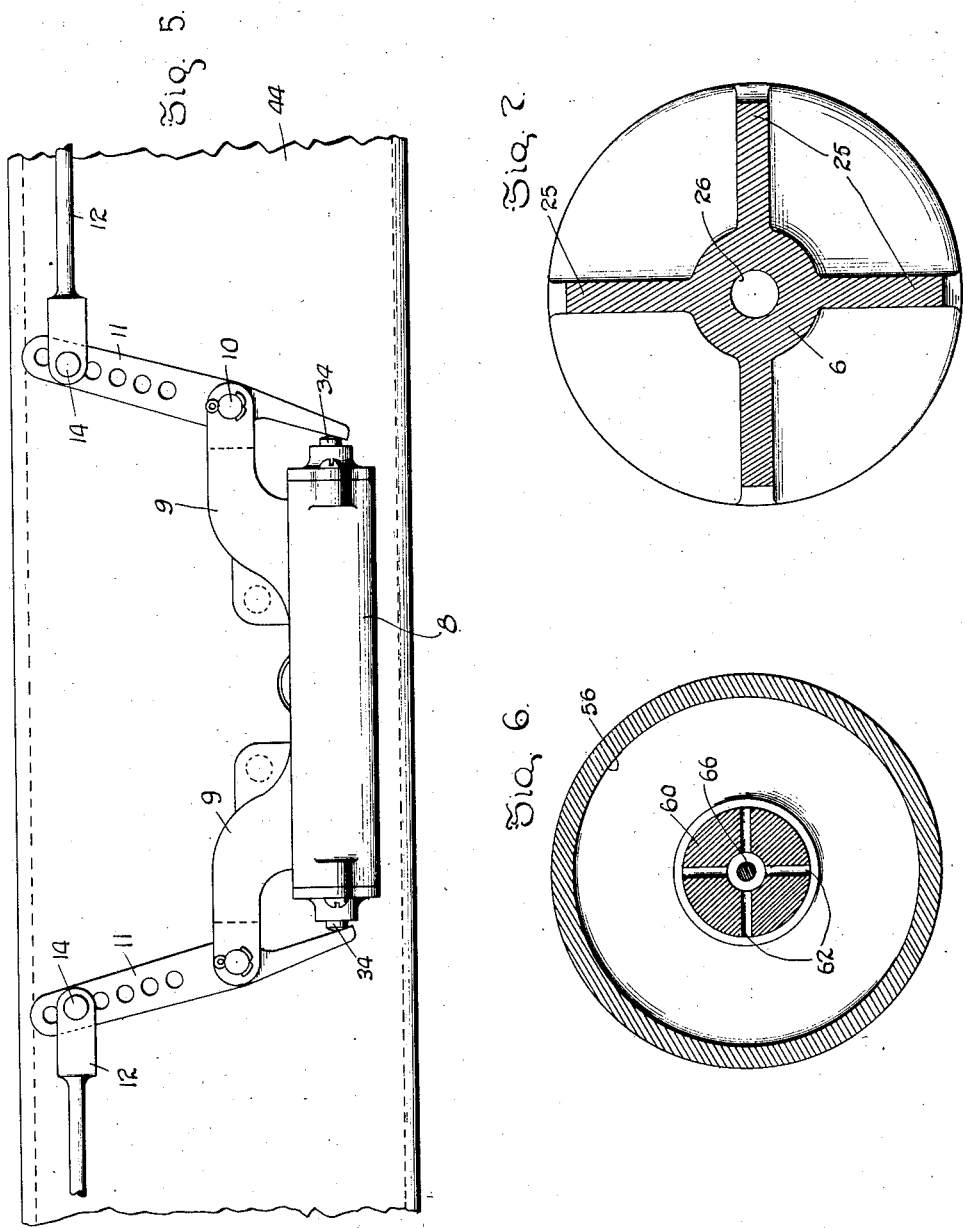
Witnesses
S. J. Collins.
F. E. Appleton
Inventor
John E. Schmidt
By Joshua R. H. Potts
His Attorney Patented Aug. 28, 1928.

1,682,425

UNITED STATES PATENT OFFICE.

JOHN E. SCHMIDT, OF CHICAGO, ILLINOIS.

EQUALIZING MECHANISM FOR AUTOMOBILE BRAKES.

Application filed October 22, 1927. Serial No. 227,931.

This invention relates to an equalizing mechanism for automobile brakes, and the object of the invention is to provide a hydraulic equalizer which is more efficient in operation, and eliminates the necessity of using copper tubing or similar material for distributing fluid pressure from the pressure cylinders to the brake cylinders.

Another object is to provide a relatively compact mechanism having a plurality of cylinders with pistons therein for creating a hydraulic pressure, and having a passage way communicating with both of the pressure cylinders for maintaining equal pressure therein.

Another object of this invention is to provide a novel equalizing means on the brake cylinders whereby the force exerted on the front and rear brake rods may be divided in the proportion desired, and such mechanism to be positive in action, thereby insuring the desired braking efforts on each of the four brakes with which the automobile is normally equipped.

My invention will be best understood by reference to the accompanying drawings forming a part of this specification, and in which, Figure 1 is a top plan view of an automobile chassis frame showing my brake equalizing mechanism applied thereto.

Figure 2 is a side elevational view of the assembly view disclosed in Figure 1.

Figure 3 is an enlarged vertical sectional view of the pressure cylinders and related mechanism.

Figure 4 is a horizontal sectional view of the mechanism disclosed in Figure 3, and being viewed from the lower side thereof.

Figure 5 is an enlarged assembly view of the brake cylinder and equalizing mechanism therefor.

Figure 6 is a cross sectional view taken on the line 6—6 of Figure 3.

Figure 7 is a sectional view taken on the line 7—7 of Figure 3.

In the drawings, and for the purposes of illustration, I have disclosed the preferred embodiment of my invention which comprises a substantially cylindrical body member 5 having extending arms 6 thereon, which are secured to extensions 7 of the brake cylinders 8. The cylinders 8 are provided with horns 9 to which are pivoted at 10, equalizing arms 11. Brake rods 12 extend from the brakes 13 to the equalizing arms 11 and are adjustably secured thereto by means of a bolt 14.

The body portion 5 is provided with two coaxial cylinders 15 in which are positioned and adapted to oscillate, pistons 16 having relatively long skirts 17' for insuring a snug and practically fluid proof engagement with the sides of the cylinders 15, in order to prevent leakage of oil from the oil chambers 17 into the casing 19. On the outer ends of the pistons 16 are positioned cups 20 made of leather or similar material, which engage the sides of the cylinders 15 for the purpose of creating a pressure in the chamber 17 when the pistons are moved in an outwardly direction. The cups 20 are reinforced by a suitable metallic expanding cup 21, and both of said cups are secured in position by means of a set screw 22 which engages a washer 23 positioned on the inner side of the metallic cup 21.

A passage way 24 extends from one chamber 17 to the other, and when fluid pressure is created in one of the chambers 17, it is apparent that an exactly equal pressure will be created in the other, since it is well known that pressure exerted upon a liquid is distributed in all directions equally.

The extending arms 6 are provided with a plurality of fins 25 for stiffening the same and a fluid passage way 26 extends entirely through said arms for communication with the chamber 17, and a similar passage way 27 through the extension 7 on the brake cylinders 8. The passage way 27 extends entirely through the extension 7, thereby permitting fluid pressure to pass directly from the pressure chambers 17 to the cylinders 8. The ends of the extending arms 6 are enlarged and threaded for engagement with the ends 28 of the body member 5 and the ends 29 of the extension 7.

The cylinders 8 are provided with two brake pistons 30 having long skirts 31 and being normally retained in an inward direction by means of coil springs 32 interposed between the rear side of the pistons and the cylinder heads 33. The piston rod 34 is provided with a reduced portion 35 which passes through the piston 30 and has a fibrous cup 36 and a metallic spring cup 37 held in place thereon, and on the inner end of the pistons by means of a washer 38, which is held in place by the nut 39.

The piston rod 34 is provided with an axial opening 40 through the greater length thereof, and terminating in a transverse opening 41, which permits a circulation of air from the outside atmosphere to the outer end of the cylinder 8, so that a pressure and vacuum therein is avoided when the piston 30 oscillates therein. The cylinder 8 is provided with cylindrical lugs 43 which are secured to the chassis frame 44 by means of set screws 45. It will be apparent that the projection 7 passes directly through the frame 44, and does not engage the same. The opening 27 through the extension 7 enters the piston 8 at a level with the top thereof, and thereby permitting any air which may find its way into the cylinders 8, to pass inwardly through the passage ways 27 and 26 into the chamber 17 and upwardly through the passage way 24. The pressure pistons 16 are connected by means of connecting rods 46 to an H member 47 on the end of the pull rod 49. A rod 50 is secured within an opening 51 in the end of the pull rod and is adjustably secured therein by means of a lock nut 52. The forward end of the rod 50 is secured to the brake pedal 53 and is drawn forwardly when the brake pedal is depressed, thereby forcing the rear end of the connecting rods 46 horizontally and forcing the pistons 16 outwardly and creating a pressure in the chambers 17 and the several passage ways into the cylinders 8, whereby pressure is applied to the brake pistons 36, which force the piston rods 34 outwardly against the lower end of the arms 11, and thereby moving the brake rods 12 in such a direction as to apply the brakes on the four wheels of the vehicle at the same time.

The connecting rods 46 together with the member 47 and the pull rod 49 comprise a toggle mechanism which is normally held in one position by means of a coil spring 54 seated within a circular flange 55 on the forward side of the casing 19. The spring 54 is of sufficient strength to return the pistons 16 to their normal position and create a partial vacuum in the pressure chamber 17, so that in case a portion of the fluid has escaped by the piston 16 or the piston 30, a fresh supply of fluid may be drawn into the chambers 17 through the passageway 24 from a fluid reservoir 26 provided on the body member 5. The reservoir 56 has an opening through the lid 57 thereof, which is normally closed by the filling plug 58. Said lid is held in place by suitable set screws 59. An opening is provided with a plug 60 having ducts 62 therethrough and a valve 63 for closing the same by engagement with the valve seat 61. A spring 64 normally engaging a washer 65 normally holds the valve 63 in a closed position. The valve stem 66 has a nut 67 thereon engaging the washer 65 for holding the spring 64 in place.

To the bottom of the casing 19 is secured a suitable cover plate 68 by means of set screw 69. An arm 70 is secured between the lug 71 and the body member and the cross frame 72 for making the installation of the device relatively rigid as shown in Figure 1.

The mode of operation of my device has been in a large measure indicated from the foregoing detailed description but will be made more fully apparent by the following brief explanation.

When the brake pedal 53 is drawn forwardly by the foot of the operator in depressing the pedal, the rear end of the connecting rods 46 will move horizontally causing a corresponding movement of the pistons 16 and a consequent pressure in chambers 17 which have communicating passages 26 and 27 leading to brake cylinder 8. The pistons 36 in the brake cylinders 8 are now moved in diametrically opposite directions by the hydraulic pressure thereby forcing the piston rods 34 and consequently the arms 11 to move. The moving of the rod 11, as best shown in Figure 5, will cause the actuation of the brake rods 12 in a manner to apply the brakes on the four wheels of the vehicle at the same time.

Having described my invention in its preferred form, it will be apparent to those skilled in the art that it is capable of certain variations and modifications without departing from the spirit of the invention, and I do not, therefore, wish to be limited to the precise details of construction herein illustrated and described, but desire to avail myself of such variations and modifications as come within the scope of the appended claims.

I claim as my invention:

1. An equalizing mechanism comprising a hollow body member having axially arranged pressure cylinders therein; pistons in said cylinders; a toggle mechanism between said pistons for operating the same; pressure chambers at the outer ends of said cylinders; brake cylinders having pistons oppositely arranged and operable by fluid pressure from said pressure chambers; arms connecting said body member with said brake cylinders; said arms having channels providing communication through the arms between said pressure chambers and said brake cylinders.

2. An equalizing mechanism comprising a hollow body member having axially arranged pressure cylinders therein; pistons in said cylinders; a toggle mechanism between said pistons for operating the same; pressure chambers at the outer ends of said cylinders; brake cylinders having pistons oppositely arranged and operable by fluid pressure from said pressure chambers; arms connecting said body member with said brake cylinders; said arms having channels providing communication through said arms between said pressure chambers and said brake cylinders; said hollow body member having a passageway between the pressure chambers which serves to equalize the pressure therebetween.

3. An equalizing mechanism comprising a hollow body member having axially arranged pressure cylinders therein; pistons in said cylinders; a toggle mechanism between said pistons for operating the same; pressure chambers at the outer ends of said cylinders; brake cylinders having pistons oppositely arranged and operable by fluid pressure from said pressure chambers; arms connecting said body member with said brake cylinders; said arms having channels communicating with said pressure chambers and said brake cylinders.

4. An equalizing mechanism comprising a hollow body member having axially arranged pressure cylinders therein; pistons in said cylinders; a toggle mechanism between said pistons for operating the same; pressure chambers at the outer ends of said cylinders; brake cylinders having pistons oppositely arranged and operable by fluid pressure from said pressure chambers; arms connecting said body member with said brake cylinders; said arms having channels therethrough between said pressure chambers and said brake cylinders; said hollow body being provided at its upper part with a pressure-equalizing passageway entering the pressure chambers on a level with the upper part thereof.

5. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders.

6. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders; said hollow body having a passageway serving to equalize pressure between said pressure chambers.

7. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders; said hollow body having a channel serving to equalize pressure between the pressure chambers and means to admit fluid to the said channel on the return of said pressure pistons.

8. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders; said hollow body being provided with a channel serving to equalize pressure between said pressure chambers and means for admitting fluid to said channel on the return of said pressure pistons, said means comprising a fluid reservoir on said body member having ducts from said reservoir to said passage way and a valve arranged for yieldingly closing said ducts.

9. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders; piston rods for said brake pistons arranged to reciprocate therewith; equalizing arms engaged by said piston rods; brake rods adjustably secured to said equalizing arms.

10. An equalizing mechanism comprising a hollow body member having a plurality of cylinders therein; pressure pistons in said cylinders; a toggle mechanism arranged to operate said pressure pistons in opposite directions; means for returning said pressure pistons to their normal positions; pressure chambers at the ends of said cylinders; brake cylinders having pistons oppositely arranged therein; means for admitting fluid from said pressure chambers to said brake cylinders; piston rods for said brake pistons arranged to reciprocate therewith; equalizing arms engaged by said piston rods; brake rods adjustably secured to said equalizing arms; means for returning said brake pistons to their normal position.

11. A fluid brake equalizing mechanism comprising a body member; cylinders within said body member having pistons oppositely arranged therein; curved connecting rods on said pistons and secured at their inner ends for movement with a pull rod; means for operating said pull rod when the brake pedal is depressed; pressure chambers at the outer ends of said cylinders; arms extending laterally and axially from said pressure chambers; brake cylinders arranged at opposite ends of said body member; extensions on said brake cylinders; said arms secured to said extensions and the ends of said body member; said arms having channels therethrough providing communicating passageways from said pressure chambers to said brake cylinders, piston rods on said brake cylinders; means engaging said piston rods and operable thereby, having brake rods adjustably secured thereto.

12. A fluid brake equalizing mechanism comprising a body member; cylinders within said body member having pistons oppositely arranged therein; curved connecting rods on said pistons and secured at their inner ends for movement with a pull rod; means for operating said pull rod when the brake pedal is depressed; pressure chambers at the outer ends of said cylinders; arms extending laterally and axially from said pressure chambers; brake cylinders arranged at opposite ends of said body member; extensions on said brake cylinders; said arms secured to said extensions and the ends of said body member; said arms having channels providing communicating passageways through said arms and said extensions from said pressure chambers, said brake cylinders being also formed with channels communicating with the arms and the extensions from said pressure chambers to said brake cylinders; piston rods in said brake cylinders; means having brake rods adjustably secured thereto and operable by said piston rods; said body member being provided with an upper longitudinal opening serving as a channel to equalize pressure between said pressure chambers; a fluid reservoir connected with said body member and means for admitting fluid from said reservoir through said equalizing passageway.

13. A fluid brake equalizing mechanism comprising a body member; cylinders within said body member having pistons oppositely arranged therein; curved connecting rods on said pistons and secured at their inner ends for movement with a pull rod; means for operating said pull rod when the brake pedal is depressed; pressure chambers at the outer ends of said cylinders; arms extending laterally and axially from said pressure chambers; brake cylinders arranged at opposite ends of said body member; extensions on said brake cylinders; said arms secured to said extensions and the ends of said body member; said arms being provided with channels serving as communicating passageways therethrough and through said extensions from said pressure chambers to said brake cylinders; piston rods on said brake cylinders; means engaging said piston rods and operable thereby, said means having brake rods adjustably secured thereto, said body member having in its upper part a second channel serving as a means to equalize pressure between said pressure chambers, a fluid reservoir connected with said body member; and means for admitting fluid from said reservoir to said second channel.

In testimony whereof I have signed my name to this specification.

JOHN E. SCHMIDT.